No. 771,663.

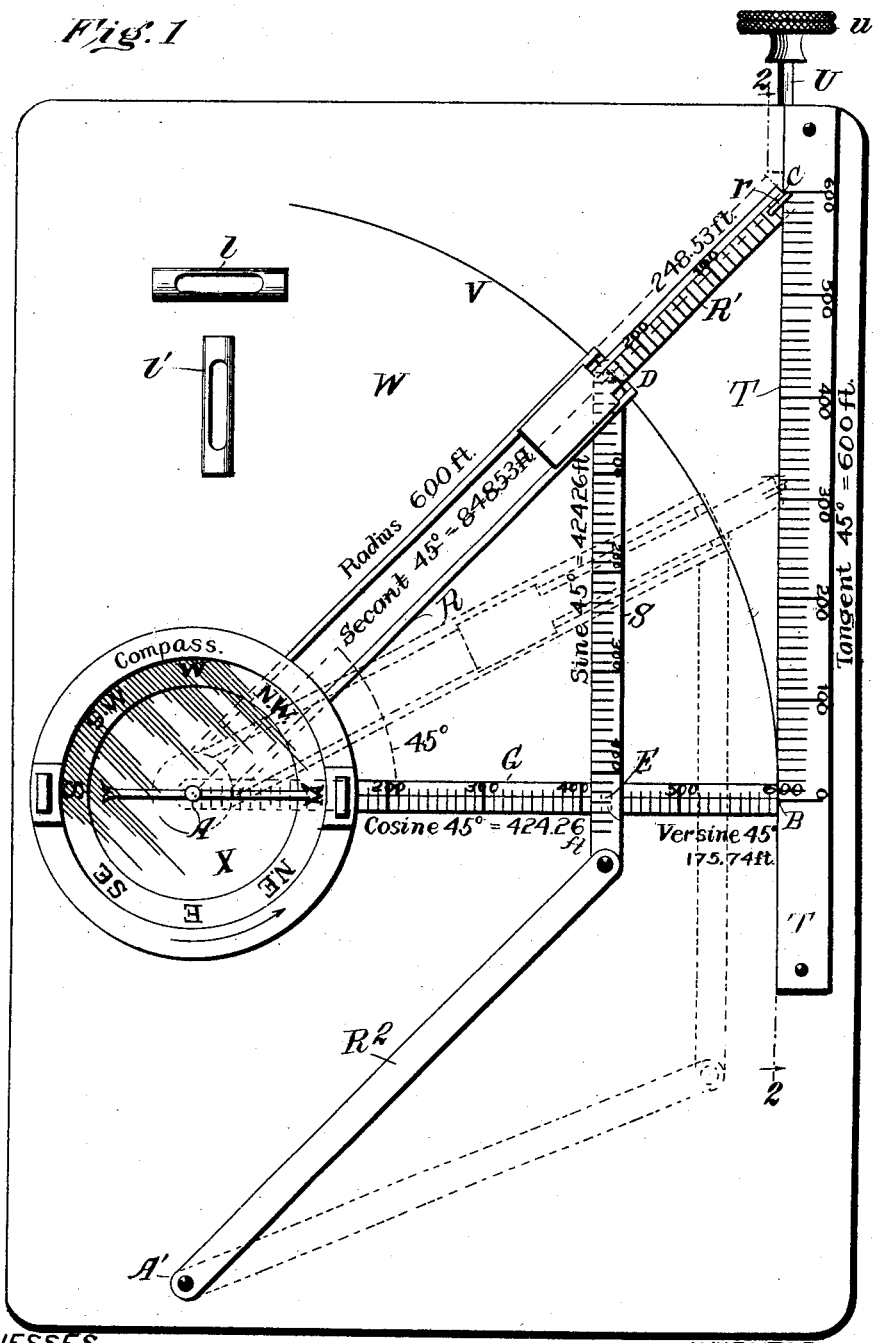

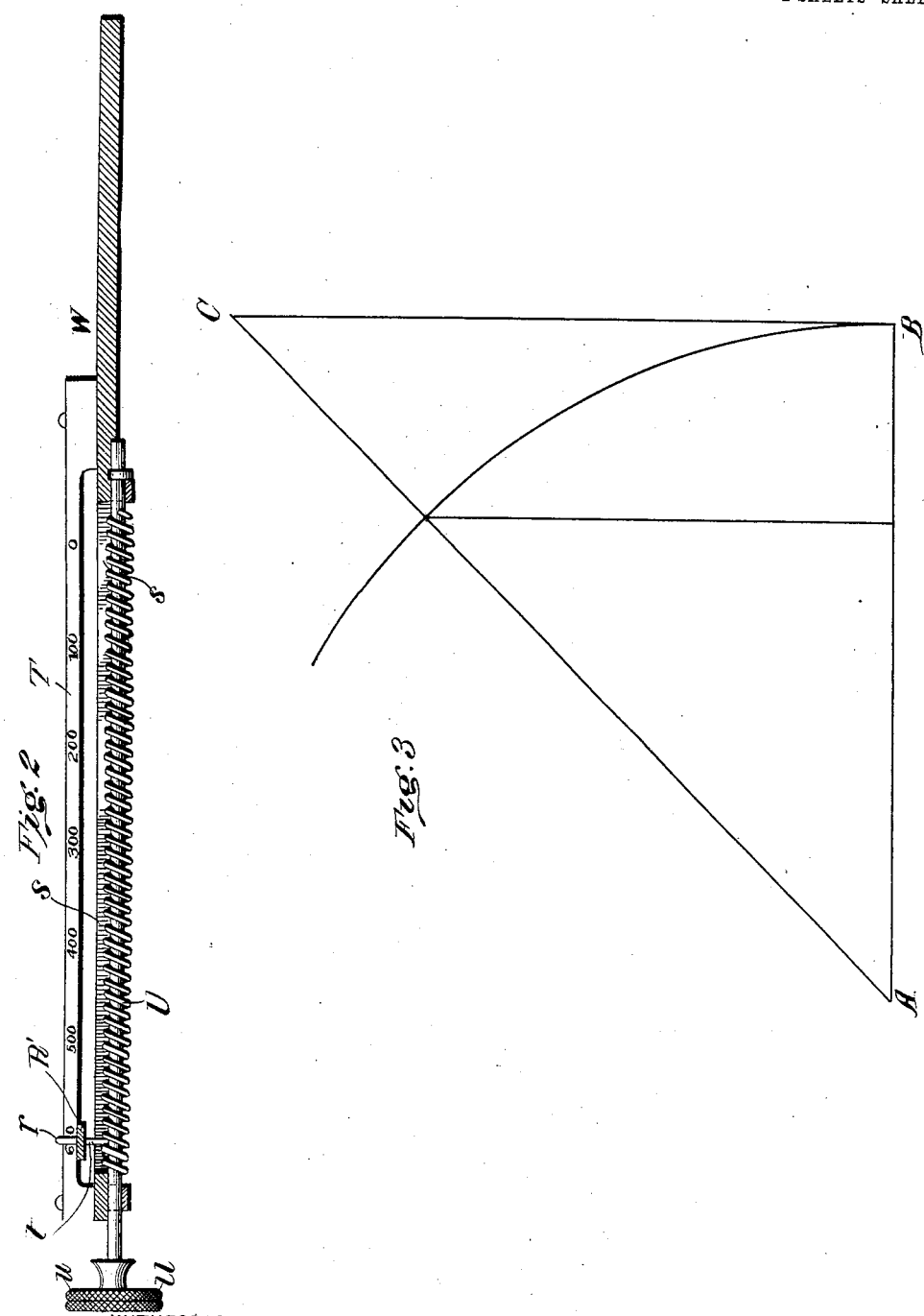

Patented October 4, 1904.

UNITED STATES PATENT OFFICE.

HARRY C. PERCY, OF NATCHITOCHES, LOUISIANA.

TRIGONOMETRICAL METER.

SPECIFICATION forming part of Letters Patent No. 771,663, dated October 4, 1904.

Application filed May 14, 1904. Serial No. 207,966. (No model.)

*To all whom it may concern:*

Be it known that I, HARRY C. PERCY, a citizen of the United States, residing at Natchitoches, in the parish of Natchitoches and State of Louisiana, have invented a new and useful Improvement in Trigonometrical Meters, of which the following is a specification.

My invention is in the nature of a trigonometrical meter designed to be used by surveyors in the field by which they can find without calculation the distance to any remote object or the height of an object and which is also serviceable in schools for the clearer teaching of trigonometrical functions, since it shows for any angle the just proportions between the different lines within and without the circle to the radius, such as the sine, cosine, secant, tangent, and versine.

It consists in the novel construction and arrangement of the instrument, which will be hereinafter fully described, and pointed out in the claims.

Figure 1 is a plan view of the instrument. Fig. 2 is a section on the line 2 2 of Fig. 1, and Fig. 3 is a diagram illustrating the use of my instrument for finding distances.

Referring to Fig. 1, R is a radial arm pivoted at A and having a longitudinally-sliding extension R'. $R^2$ is a similar radial arm of equal length to R, but pivoted about another center, A'. S is a straight bar graduated for distances in feet, progressing from the upper to the lower end. This bar is pivoted at D to the end of the radial arm R and at its other end is pivoted to the free end of the radial arm $R^2$. The bar S swings with the ends of the two arms R and $R^2$, and as these arms are of equal length the graduated bar S has a parallel motion in its various adjustments. G is a fixed and graduated base-line scale mounted on the table-surface W, and T is a fixed and graduated tangent-bar, also mounted on the table-surface and occupying a position at right angles to the base-scale G. This base-scale extends from the center A of the radial arm R to the right-angular tangent-bar T. The tangent-bar T (see Fig. 2) is slightly raised above the table-surface W, and beneath it is extended the end of the extensible section R' of the radial arm. This extensible section R' is graduated (see Fig. 1) and bears at its outer end a pointer $r$, passing over the graduation of the tangent-bar T, and has also on the under side a pin $t$, which extends through a long slot $s$ in the table W and enters the thread of a long traverse-screw U. This screw is journaled in bearings below the table W, and said long screw and slot are arranged beneath and exactly parallel with the tangent-bar T above the table. The screw is provided with a milled head $u$, and when the screw is turned it causes the pin $t$ of extensible section R' to traverse the thread lengthwise, and as it moves in a straight line it causes the radial arm R to swing and its sliding extension R' to be drawn out or forced inwardly in the line of the radial arm, also imparting a lateral parallel motion to bar S. The radial arm R and base-scale G being of the same length and a circle V being described by the arm R as a radius, this circle will join the base-scale G at its point of intersection with the tangent-bar T, and the instrument will then represent the various trigonometrical functions, as follows: R is the radius. R+R' will be the secant; T, the tangent. The distance D to E measured on bar S will be the sine. The distance A to E measured on the base-scale G will be the cosine, and the distance E to B on the base-scale will be the versine. It will also be seen that the relation of these several trigonometrical functions to each other will be true for all varying adjustments of the radial arm, as shown, for instance, in dotted lines, since bar S is always perpendicular to base G in said adjustment. As the extension R', bar S, base G, and tangent T are graduated, any change in the position of the movable parts indicates at once without calculation the values in figures of the various trigonometrical functions. Thus assuming the base-line scale G to have a maximum of six hundred feet and the tangent T a similar graduation up to six hundred feet, then with the instrument in the full-line position, in which the radius R makes an angle with G at A of forty-five degrees, the secant (A to C) will be 848.53 feet or the radius R six hundred feet (same as base) plus the readings of section R', which is 248.53 feet. The sine (D to E) will be 424.26 feet, the cosine (A to E) will be 224.26 feet, the versine (E to B) 175.74 feet, and the tangent six hundred feet. In whatever position the movable member may be placed by the adjusting-screw the numerical readings change in proper proportion and are at once observable without calculation.

I will now explain how the instrument may be applied to measuring of distances. For this purpose a compass X is concentrically mounted at A above the pivotal center of the radial arm and is rotatable independent of the radial arm, and on the table-surface are mounted two levels $l$ $l'$. Referring now to Fig. 3, we will suppose it is desired to get the distances from B to C or from A to C. The instrument, Fig. 1, is placed at B and the remote object C is sighted through the compass. The compass is then turned ninety degrees to establish the position of the base-line A B. The distance A B is then measured off for a base-line. The instrument is next taken to A, and the compass is sighted back to B with scale G coincident with base-line A B, and the position of the compass is noted. The compass is then turned and sighted to the remote object C, and the angle B A C is obtained. Now by means of the traverse-screw U the radial arm R and extension R' are adjusted into alinement with the last sight-line A C, and the distance B C of Fig. 3 will be read on the tangent-bar T and the distance A C will be read by the added readings of R and R'. If instead of a compass a transit is used having an adjustment in a vertical plane it is obvious that any height C B or distance A C to an elevated point may be obtained in like manner.

Having thus described my invention, what I claim as new, and desire to secure by Letters Patent, is—

1. A trigonometrical meter, comprising a pivoted radial arm having a sliding and graduated extension, a graduated and stationary base-line scale, a stationary graduated tangent-bar, a parallel-motion sine-bar pivoted to the radial arm and means for moving the radial arm substantially as shown and described.

2. A trigonometrical meter, comprising a pivoted radial arm having a sliding and graduated extension, a graduated and stationary base-line scale, a stationary and graduated tangent-bar, a graduated sine-bar pivoted at one end to the outer end of the radial arm, a second radial arm of equal length to the first pivoted to the other end of the sine-bar and having a stationary pivot at its other end and means for moving the radial arms and sine-bar substantially as shown and described.

3. A trigonometrical meter, comprising a slotted table having a graduated tangent-bar fixed to the table parallel to its slot, a traverse-screw arranged beneath the table parallel to the slot, a pivoted radial arm having an extensible section graduated as described and having a pin traversing the screw and a parallel-motion sine-bar pivoted to the outer end of the radial arm substantially as shown and described.

4. A trigonometrical meter comprising a pivoted radial arm having a sliding and graduated extension, a graduated and stationary base-line scale, a stationary graduated tangent-bar, a parallel-motion sine-bar pivoted to the radial arm, means for moving the radial arm and sine-bar, and a compass independently pivoted over the center of the radial arm substantially as described.

HARRY C. PERCY.

Witnesses:
ANGUS FLEMING,
J. H. HICKS.